Patented Dec. 5, 1933

1,937,752

UNITED STATES PATENT OFFICE 1,937,752

MANUFACTURE OF DEXTRINE FROM CORN STARCH

Arthur D. Fuller, New Rochelle, N. Y., assignor to National Adhesives Corporation, New York, N. Y., a corporation of Delaware No Drawing. Application November 17, 1932
Serial No. 643,055

8 Claims. (Cl. 127—39)

This invention relates to the manufacture of dextrine, and more particularly to the dextrinizing of corn starch.

As is well known, starch may be transformed into dextrine in various ways. The simplest method consists in heating or roasting the starch to elevated temperatures, the transformation into dextrine being accelerated by assisting the effect of the high temperature by the degrading action of acids. This acidulating method yields not only an improved product, but permits the transformation to be accomplished in much shorter time. Starch acidulation, however, must be carefully controlled so as to prevent as far as possible the formation of starch sugar, it being required that the amount of acid used be kept to within small and controllable limits.

I have empirically found that contrary to the usual practice of manufacturing dextrine by acidulating starch, dextrines of proper color and fluidity and possessing maximum solubility may be made by dextrinizing starch to which alkali has actually been added to raise the pH above that point which is normal in commercially pure starch. I have found further that the adhesive qualities and clarity of the dextrine produced are very much superior to the standard commercial dextrine. The reason for this, it is believed, is that the acid which is used in the standard processes of dextrinization for the purpose of catalyzing the conversion serves to actually degenerate the quality of the finished dextine, whereas in the dextrinizing process of the present invention, dextrine is manufactured not only without adding acid, but by actually adding an alkali to the starch. The prime object of the present invention centers about this method of manufacturing dextrine, and particularly from corn starch.

The present application is a continuation in part of my copending application Serial No. 506,735 to Method of manufacturing modified starches, etc., filed Jan. 5, 1931.

The manufacture of the present invention is practiced in steps or stages as follows:

(a) *Chlorination.*—Corn starch in suspension in water at any convenient density is treated with a chlorine containing body such as a calcium hypochlorite solution, the treatment being carried out so as to effect a reaction between the starch material and the available chlorine. This first operation for convenience is referred to as chlorination, although other effects are produced such as the following: oxidation of the starch to some extent; a destructive action on certain impurities, if impurities there be, in the starch, whereby such impurities may be washed out and the removal of impurities remaining insoluble such as fibrous material facilitated without excessive starch losses; decolorization of the material due probably to the oxidizing action above referred to; chlorination of the starch by which is intended a chemical reaction between the available chlorine and the starch material as evidenced by the facts that the starch so treated retains the chlorine when heated, the ash content of the treated starch is substantially increased and the fluidity thereof in dilute caustic soda is substantially (several times) increased although the water fluidity thereof is not materially altered. The chemical reaction tenders the starch and renders the same capable of subsequent accelerated conversion.

This treatment of the starch suspension or milk with calcium hypochlorite or an equivalent chlorine containing body is carried out in an alkaline medium, the alkalinity of which is so adjusted that the pH value of the starch is raised to a point between the neutral point and the normal pH value of purified starch. This treatment may be carried out at room temperature, but is preferably performed at slightly elevated temperatures substantially lower, however, than the gelatinizing temperature of the starch. The hypochlorite is introduced into the starch milk a little at a time over a considerable period of time, and the magma is kept in agitation, preferably, until the available chlorine is completely absorbed, that is, until the chlorine in any form capable of reacting with the starch material is all taken up by the starch. The amount of chlorine thus absorbed is preferably about ½ of 1 per cent on the dry basis weight of the starch. The hypochlorite is preferably a clear solution free from sludge.

(b) *Dewatering and washing.*—The starch reaction magma produced in the chlorination step is then preferably screened to separate such fiber and insoluble impurities as result in the chlorination step. This starch product is then dewatered and washed by passing the same preferably through filter presses, and desirably through filters of the vacuum type. Here warm water sprays may be used to facilitate the removal of any soluble impurities, particularly those resulting from the chlorination treatment. The chlorinating treatment having had substantially no hydrolyzing action on the starch material, and the chlorine having been absorbed by and reacted with the starch material, there is substantially no loss either in the chlorine reagent or the starch product in this dewatering and washing stage.

(c) *Drying and dextrinization.*—The filtered starch cake is then dried, as by passing the same through heated tunnels. The dried product is then ground, further dried if desired, and then roasted in dextrine cookers. The dextrine product obtained here has a soluble content of 99 per cent, a moisture content of 1.3, a sugar content of about 2 per cent, and a fluidity comparable to the usual well converted corn dextrine.

The following is a specific example of the application of the invention to the production of a corn starch dextrine:

26,800 pounds of corn starch milk at 21.5° Baumé is brought to a temperature of 110° F. and 492 gallons of alkaline calcium hypochlorite is added. The calcium hypochlorite is preferably of a concentration such that there is contained in the 492 gallons the equivalent of 134 pounds of available chlorine. The alkalinity of the calcium hypochlorite is such that with these amounts used the starch magma is given a pH of about 6.5. The hypochlorite solution used is previously prepared by passing chlorine gas into a deep tank containing lime water and adjusted so that there are thirty grams available chlorine per liter of solution. The clear solution is decanted or siphoned off from the sludge. The starch milk will ordinarily be acid, the pH value of pure corn starch even though well washed being normally approximately 5.0. The hypochlorite solution should be sufficiently alkaline to raise the mixture to a pH value between the neutral point and the normal pH value of the purified starch and preferably to a value of about 6.5. The alkalinity of the starch mixture may be controlled by fixing the alkalinity of the hypochlorite solution or the control may be supplemented by the addition to the reacting starch mixture of suitable amounts of calcium hydroxide. The hypochlorite solution should be added slowly; for example, the operation may require one-half to one hour; and after the hypochlorite is completely added, the starch milk is further agitated until the absorption of the available chlorine is complete. This absorption may require from three to four hours.

The starch magma obtained in the chlorination step is then preferably run over silk shaker screens to separate such additional fibrous and other insoluble impurities which are freed as a result of the chlorination treatment. The reaction starch milk is then dewatered in filters preferably of the vacuum type where water sprays are preferably used to facilitate the removal of residual soluble impurities. The resulting filter cake is then dried at relatively low temperatures. Any method of drying such as involving the use of rotary driers or vacuum driers may be used, a preferred method consisting in loading the filter cake on wagons and kiln-drying the same at 190° F. for a period of thirty-six hours. The starch product after this drying has a moisture content of about 10 per cent. At this stage the product is then preferably ground and sent through Huhn driers prior to dextrinization. The analysis of the starch at this point is substantially as follows: moisture—5.30%; soluble—1.52%; $SO_2$—0.0006%; grit—0.020%; pH—6.2; acidity—0.047%; soluble ash—0.70%; insoluble ash—0.30%.

This starch product is then loaded into dextrine cookers without further treatment of any kind, and a steam pressure of 150 pounds is applied to the jacket of the cookers. The roasting operation is preferably carried out so that the starch is raised to a temperature of 300° F. over a period of seven hours and to a temperature of 325° F. at the end of twelve hours, this latter temperature being then maintained for a period of another fourteen hours. The finished dextrine has a soluble content of 99%, a moisture content of 1.3, a sugar content of about 2%, and a fluidity comparable to the usual well converted corn dextrine.

In place of sensitizing the starch by chlorination, the pretreatment of the starch to prepare it for dextrinization may be brought about, although with less desirable results, by the use of a non-chlorine containing oxidizing agent as is described in my aforesaid copending application Serial No. 506,735, of which the present application is a continuation in part.

While I have described the preferred method of manufacturing dextrine following the principles of my present invention, it will be understood that many variations may be made in the sequence of steps and proportions of ingredients as well as the substitution of equivalent reagents without departing from the spirit of the invention defined in the following claims.

I claim:

1. The method of making dextrine which consists in reacting wet starch with a chlorine containing body and incorporating therewith an alkaline medium producing thereby a chlorine reaction starch product having a pH value between the neutral point and the normal pH value of purified starch, and in then heating the product to convert the same to dextrine.

2. The method of making dextrine which consists in treating starch with an alkaline hypochlorite solution producing a chlorine reaction starch product, in adjusting the alkalinity so that the product has a pH value of about 6.5, and in then heating the product to convert the same to dextrine.

3. The method of making dextrine which consists in reacting starch milk with a chlorine containing body, incorporating therewith an alkaline body producing thereby a chlorine reaction starch product having a pH value of about 6.5, and in then heating the product to convert the same to dextrine.

4. The method of making dextrine which consists in mixing and reacting starch with a hypochlorite solution until about ½% of available chlorine on the dry basis weight of the starch is absorbed thereby and reacted therewith, in incorporating with the mixture an alkaline medium producing thereby a chlorine reaction starch product having a pH value of about 6.5, and in then heating the product to convert the same to dextrine.

5. The method of making dextrine which consists in mixing and reacting starch with a chlorine containing body, incorporating with the mixture an alkali medium producing thereby a chlorine reaction starch product having a pH value of about 6.5, screening and filtering the starch magma to eliminate therefrom insoluble and soluble impurities and to dewater the same, heating the product to dry the same and then roasting the product to convert the same to dextrine.

6. The method of making dextrine from corn starch which consists in mixing and reacting corn starch with a hypochlorite solution until about ½% of available chlorine on the dry basis weight of the starch is absorbed thereby and reacted therewith, simultaneously incorporating with the mixture an alkali medium producing thereby a chlorine reaction starch product having a pH value between the neutral point and the normal pH value of purified corn starch, eliminating impurities and filtering the starch magma and heating and roasting the product to dry the same and convert the same to dextrine.

7. The method of making dextrine which consists in mixing and reacting starch with an oxidizing agent which tenders the starch and renders the same capable of accelerated conversion, the said tendered starch being a reaction product of the starch and said agent, incorporating with the mixture an alkali medium producing thereby a reaction starch product having a pH value between the neutral point and the normal pH value of purified starch, and thereafter heating and roasting the product to dry the same and convert the same to dextrine.

8. The method of making dextrine which consists in mixing and reacting starch milk with an oxidizing agent which tenders the starch and renders the same capable of accelerated conversion, the said tendered starch being a reaction product of the starch and said oxidizing agent, incorporating with the mixture an alkali medium producing thereby a reaction starch product having a pH value of about 6.5, filtering the starch magma, and thereafter heating and roasting the product to dry the same and convert the same to dextrine.

ARTHUR D. FULLER.